March 2, 1926. 1,575,479
J. HAUVETTE-MICHELIN
TIRE FLAP
Filed May 12, 1925 2 Sheets-Sheet 1
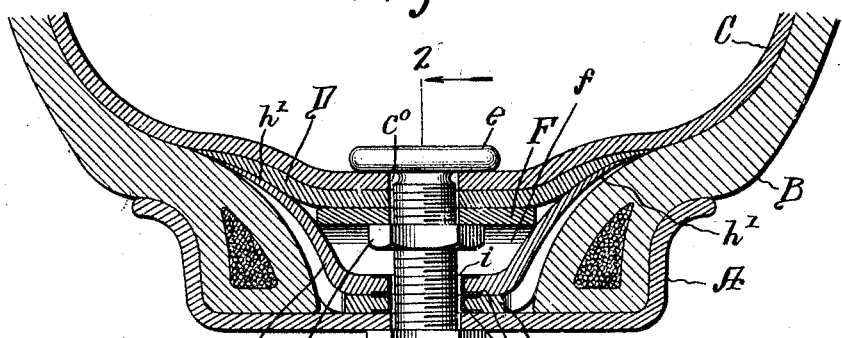
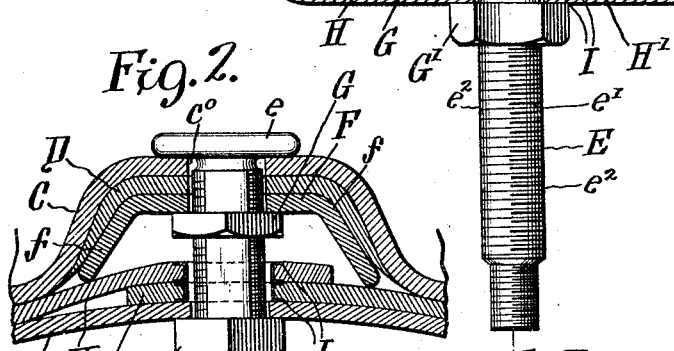
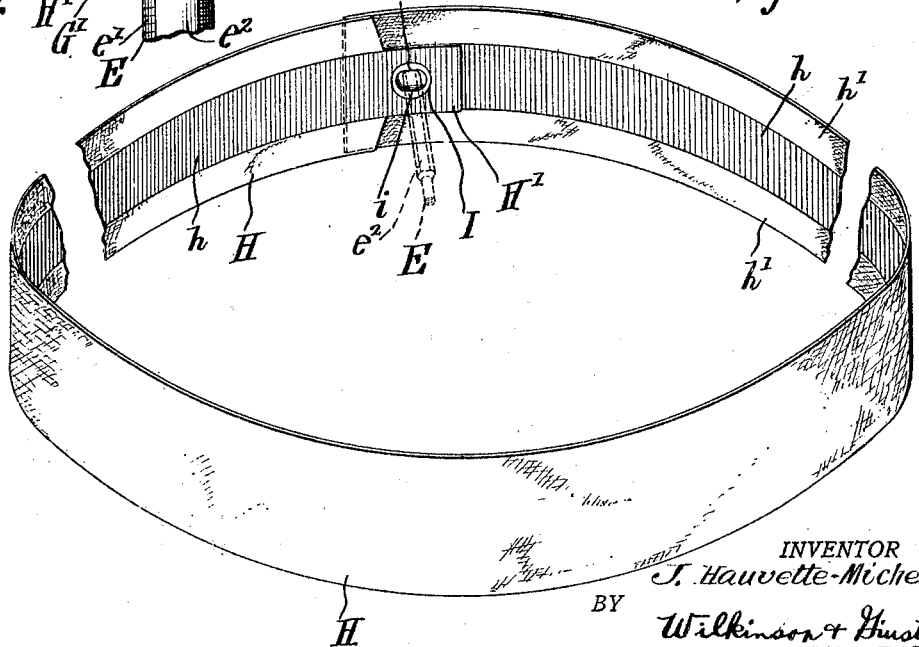
INVENTOR
J. Hauvette-Michelin
BY Wilkinson & Giusta
ATTORNEYS.

March 2, 1926.  J. HAUVETTE-MICHELIN  1,575,479

TIRE FLAP

Filed May 12, 1925   2 Sheets-Sheet 2

INVENTOR
J. Hauvette-Michelin
BY
Wilkinson & Giusta
ATTORNEYS.

Patented Mar. 2, 1926.

1,575,479

UNITED STATES PATENT OFFICE.

JULES HAUVETTE-MICHELIN, OF NEW BRUNSWICK, NEW JERSEY.

TIRE FLAP.

Application filed May 12, 1925. Serial No. 29,769.

*To all whom it may concern:*

Be it known that I, JULES HAUVETTE-MICHELIN, a citizen of the French Republic, residing at New Brunswick, in the county of Middlesex and State of New Jersey, have invented certain new and useful Improvements in Tire Flaps; and I do hereby declare the following to be a full, clear, and exact description of the invention, such as will enable others skilled in the art to which it appertains to make and use the same.

A tire flap, as generally used, is a long strip made of several plies of duck and rubber, thick in the middle and tapering off to a thin edge on both sides. It is the general practice to cut a round hole at one end of the flap and an oblong hole at the other end, so as to hook the flap over the tire valve to hold it in place. The flap is used for the protection of the inner tube against rust that accumulates on the rim and also to prevent the inner tube from being pinched between rim and beads of casing.

It has been found that the holes at each end of a flap do not resist the strain on the flap caused by sudden braking or abrupt starting of the car, or when running with low inflation. These actions tend to cause the ends of the flap to move out of their place and to slip up on one side or other of the casing. The inner tube is thereby exposed to the base of the bead of the casing and subject to be pinched between the bead and rim.

It has also been found that due to the holes, which are merely punched in the soft material of the flap, a fixed length between holes is difficult to determine. Therefore, one hole is sometimes made oblong to compensate for a variation in length. However, when such a flap is placed in a casing, it easily happens that on account of its excess length, it may be placed badly in that it is pushed too much to one side and thus allows the inner tube to be exposed on the opposite side, and subject to injury. A further disadvantage of the common flap is the length which has to be allowed at each end to reinforce it. This makes it necessary to overlap the ends of the flap for a comparatively long distance. This overlap results in double thickness for this section which tends to injure the tube and casing.

It has also been found that the flap has a tendency to cross its ends instead of remaining in its proper alignment. When the ends are crossed in such a manner the flap, further back, slips up on one side and exposes the inner tube.

In order to avoid these and other objections encountered in the use of flaps as now ordinarily constructed, I provide an improved construction, which will be more fully understood after reference to the accompanying drawings, in which like parts are indicated by similar reference symbols throughout the several views, and in which Figure 1 shows a cross section through the rim and beads of a tire at the point where the valve stem passes and shows the valve stem in elevation.

Figure 2 is a similar view to Figure 1, showing a section along the line 2—2 of Figure 1, and looking in the direction of the arrows.

Figure 3 is a perspective view of a complete flap as detached from the tire, parts being broken away, and the valve stem being indicated in dotted lines.

A represents a rim which may be of any preferred or well known construction.

B represents the tire casing or shoe, which may also be of any well known or preferred construction, but in Figure 1 it is shown as the straight side type.

C represents the inner tube, which is also of the usual construction, and is provided with the usual reinforcing patch D surrounding the perforation $c^0$ in the inner tube provided for the valve stem E. The valve stem E is provided with the usual flanged head $e$ and with the interrupted screw threads $e'$ and the flat faces $e^2$, said flat faces being on opposite sides of the valve stem for purposes well known in the art.

Figure 4:
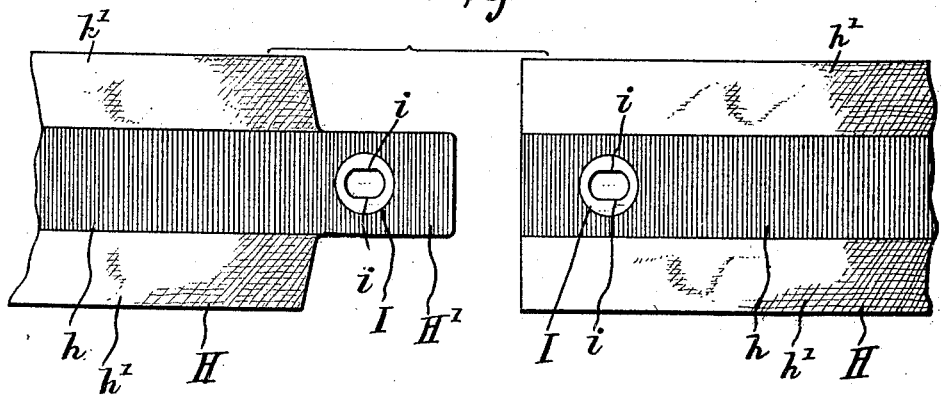
Figure 4 shows the two ends of the flap constructed according to my invention, the two ends being separated.
Figure 5:
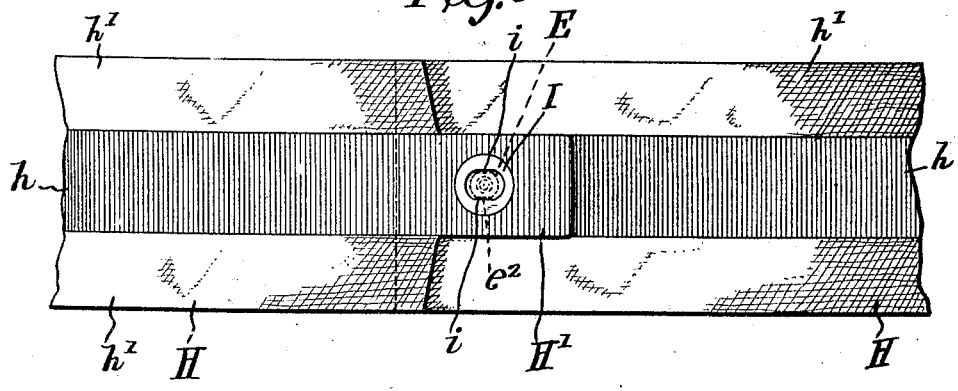
Figure 5 shows the two ends assembled and with the valve stem indicated in dotted lines.
Figure 6:
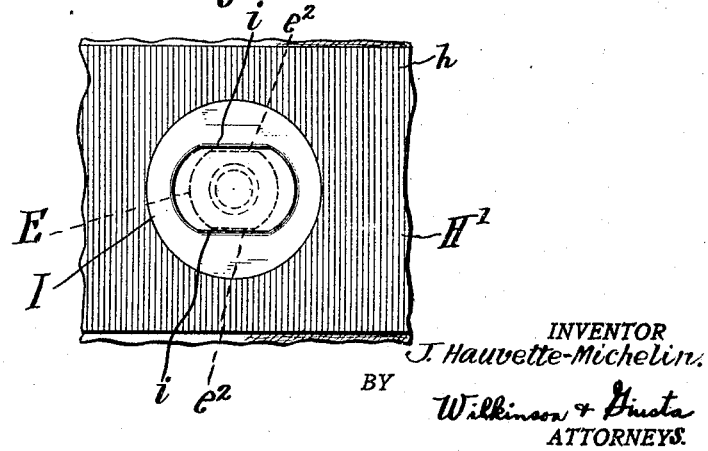
Figure 6 is a detail showing more clearly one of the metal eyelets having parallel side walls, the valve stem being indicated therein in dotted lines.

Mounted on the valve stem, and engaging the patch D is the curved metal plate or bridge F having inwardly projecting curved arms $f$, which bridge serves to protect the inner tube against injury by contacting with the locking nut G holding the valve stem in an air tight position with regard to the inner tube. When assembled on the tire, the valve stem is secured in place by means of one or more nuts G'. The foregoing parts are all of the present or well known construction, and do not constitute in themselves a part of my invention, which invention relates more especially to the flap H, which is made of a strip or band of flexible material, such as canvas or the like, which is preferably thickened and coated with rubber at the center as at $h$, and tapered at the sides as at $h'$. Near one end of the strip, the sides of said strip are cut away to form a tongue H', and in this tongue and also in the opposite end of this strip, I provide eyelets I as shown most clearly in Figures 4 to 6. These eyelets are preferably provided with elongated openings having their side walls $i$ parallel and adapted to engage the flat sides of the valve stem, and thus to prevent either end of the strip, when the parts are in assembled position shown in Figures 1, 2 and 5, from twisting laterally. If desired, one only of the eyelets may have the elongated openings, but, preferably, the eyelet in the tongue, which should be provided with the opening substantially of the shape shown in Figure 6. By the construction shown, the ends of the strips are reinforced, and are not likely to tear off at the perforations, and thus the length of the double thickness of the parts is materially reduced, and, moreover, by the construction shown, the eyelets are protected by the overhanging bridge F, and it is not possible for them to come in contact with the inner tube in any way incident to the use of the tire on the wheel. By using the tongue at one end of the flap, as shown, there is very little overlapping of the sides of the flap, and the major portion of the overlap is beneath the bridge as shown. Obviously, the overlap of the flap is to be avoided if possible as injurious to the casing and tube.

Furthermore, by using metallic eyelets near the ends of the flaps, the flap, when being mounted, has to be stretched in such a way as to eliminate all possible misalignment of the flap, and consequent injury to the tube or casing, and all possible wrinkles and folds which would be injurious to the casing. Furthermore, the reinforced holes in the flap do not tear so readily; the ends of the flap are held in proper alignment due to the shape of the holes in the eyelets, which are guided by the flat faces on the valve stem; and the tongue which can be provided at one end of the flap with a reinforced hole, allows the reduction of the overlap of the two ends of the flap.

While I prefer to use a flap having a tongue at one end thereof as described, and provided with eyelets having elongated slots with parallel sides as shown, the tongue may, under certain conditions, be omitted, and ordinary circular metal eyelets may be used at one or both ends of the flap.

Having thus described my invention, what I claim and desire to secure by Letters Patent of the United States is:

1. A flap for use with a pneumatic tire, having an inner tube and a valve stem, composed of a strip of flexible material having the sides at one end cut away to form a central tongue, with a metal eyelet in said tongue and a metal eyelet in the other end of said strip, both eyelets being adapted to slip over the valve stem of the inner tube, substantially as and for the purposes described.

2. A flap for use with a pneumatic tire, having an inner tube and a valve stem with flattened sides, composed of a strip of flexible material having the sides at one end cut away to form a central tongue, with a metal eyelet in said tongue and a metal eyelet in the other end of said strip, one of said eyelets having elongated openings therein with parallel side walls, said eyelets being adapted to slip over the valve stem of the inner tube, and said parallel sides engaging the flat sides of the valve stem, substantially as and for the purposes described.

3. A flap for pneumatic tires, composed of a strip of flexible material thickened in its centre and tapering in thickness towards the sides, the said sides being cut away at one end to leave a central tongue, and said tongue and the opposite end of the strip being provided with metal eyelets, one of said eyelets having on elongated opening therein, the side walls of said opening being parallel to each other, substantially as and for the purposes described.

4. A flap for pneumatic tires, composed of a strip of flexible material thickened in its centre and tapering in thickness towards the sides, the said sides being cut away at one end to leave a central tongue, and said tongue and the opposite end of the strip being provided with metal eyelets, substantially as and for the purposes described.

5. In a pneumatic tire, the combination with an inner tube and a valve stem therefor having flattened sides, and a curved bridge carried by said valve stem, of a flap, composed of a strip of flexible material thickened in its centre and tapering in thickness towards the sides, the said sides being cut away at one end to leave a central tongue, and said tongue and the opposite end of the strip being provided with metal eyelets, adapted to slip over said valve stem, one of said eyelets having an elongated opening therein, the side walls of said opening being parallel to each other to engage the flat side walls of said valve stem, and said bridge being adapted to project between said eyelets and the inner tube, substantially as and for the purposes described.

6. In a pneumatic tire, the combination with an inner tube and a valve stem therefor, and a curved bridge carried by said valve stem, of a flap, composed of a strip of flexible material thickened in its center and tapering in thickness towards the sides, the said sides being cut away at one end to leave a central tongue, and said tongue and the opposite end of the strip being provided with metal eyelets, adapted to slip over said valve stem, and said bridge being adapted to project between said eyelets and the inner tube, substantially as and for the purposes described.

JULES HAUVETTE-MICHELIN.